June 24, 1958
C. V. FRY
2,839,860
CAR VISOR CALENDAR
Filed Feb. 23, 1956
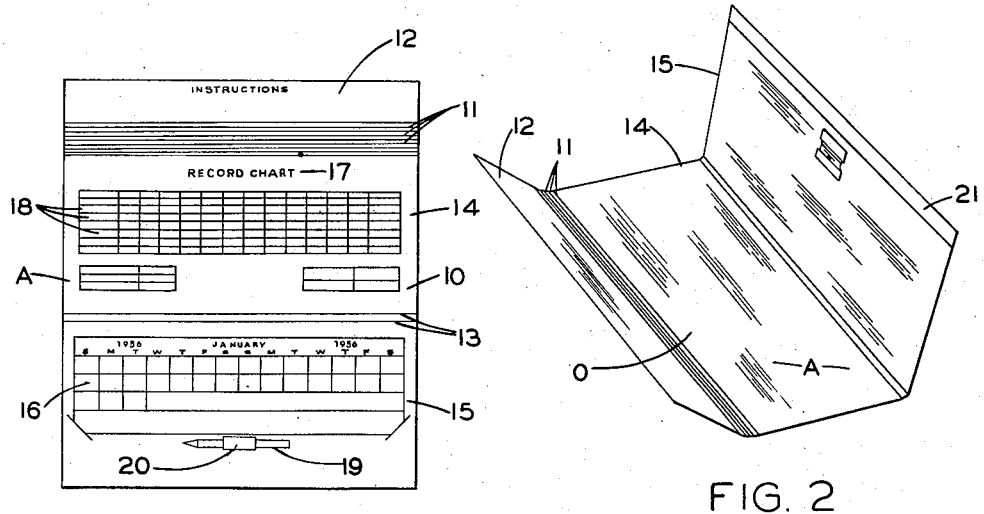
FIG. 1
FIG. 2
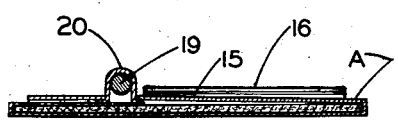
FIG. 5
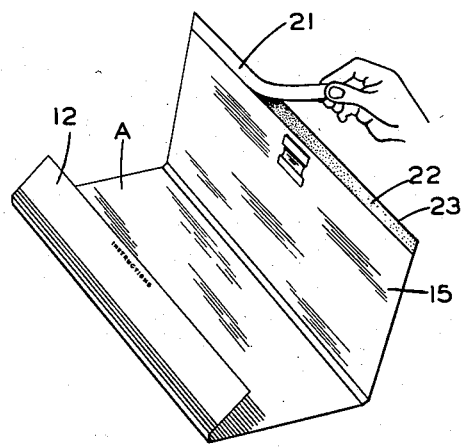
FIG. 3
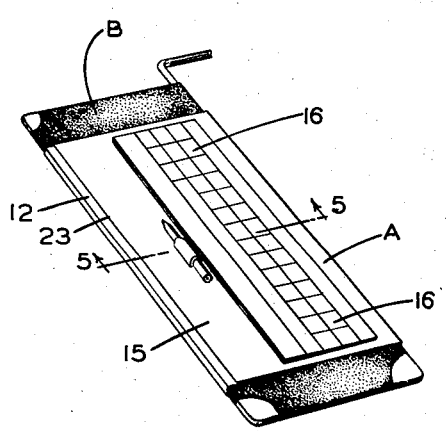
FIG. 4
*INVENTOR.*
CLAIR V. FRY
BY
ATTORNEY

United States Patent Office 2,839,860
Patented June 24, 1958

2,839,860

CAR VISOR CALENDAR

Clair V. Fry, St. Paul, Minn., assignor to Brown & Bigelow, St. Paul, Minn., a corporation of Minnesota Application February 23, 1956, Serial No. 567,171

2 Claims. (Cl. 40—121)

This invention relates to a car visor calendar which is adapted to be attached to the visor of an automobile to provide a calendar with the months of the year and other indicia associated with the particular month together with other indicia pertinent to the operation of the automobile.

A feature resides in providing a car visor calendar which is adapted to be wrapped around the visor of a car and which is adjustable for different size visors so that a motorist can attach this calendar to his car visor adjusting it to the width of the visor.

A feature resides in providing an automobile visor calendar which supports a pencil associated with the calendar pad so that the motorist can make notes on the calendar with a pencil thereby providing a convenient and easy means for the motorist to keep track of the expenditures for gas, oil, lubrication each month by making a memorandum thereof on the respective calendar month pad.

The visor calendar is also provided with a record chart on the side thereof opposite to the sides supporting the monthly calendar pad. This record chart is printed with indicia to indicate the various items such as gasoline, oil, lubrication, repairs, tires and miscellaneous items. (Such indicia not being shown in the drawings.) The record chart also has indicia to indicate vertical columns which are dated with the different months of the year such as January, February, etc. to include the whole year. (This indicia is not shown in the drawings.) Thus a compact record chart is provided on the back of the visor calendar to summarize the record of the recipient's automobile expenses etc. throughout an entire year.

A feature resides in providing the visor calendar with a wrap around construction so that it may be wrapped around and adjusted to the particular car visor to which it is attached, and by means of a series of longitudinal scored grooves the visor calendar may readily be adjusted to the sides of the visor. The visor calendar is also formed with a marginal strip of adhesive which is normally covered by a strip of removable tape. This makes it easy for the recipient to wrap the visor calendar around his visor. Thus no other attaching means is required for the visor calendar.

The various features and objects of the invention will be more fully hereinafter set forth.

In the drawings forming part of this specification:

Figure 1 illustrates my visor calendar opened out flat to show the outer sides of the same.

Figure 2 is a perspective view of the inside of my visor calendar.

Figure 3 is a perspective view looking toward the inside of the visor calendar and showing the act of removing the tape from the adhesive surface.

Figure 4 illustrates my visor calendar attached or wrapped around an automobile visor.

Figure 5 is an enlarged section on the line 5—5 of Figure 4.

In the drawings the visor calendar A is formed with a body member 10 which is formed with a series of scored grooves 11 adjacent the inner portion of the flap 12. The body 10 is also formed with scored grooves 13 which are positioned between the back portion 14 and the front portion 15 of the body 10 of the visor calendar.

The body 10 is a comparatively strong cardboard-like nature and is adapted to support a calendar pad 16 on the front of the same. The rear surface 14 thereof is provided with indicia under the heading "Record Chart" 17 (indicia not being illustrated in the drawings), while the spaces 18 below the heading "Record Chart" are provided for indicia such as gas, oil, tires, etc. in the first column (indicia not being illustrated in the drawings) and the other columns in said spaces are for indicating the different months of the year with a final vertical column in said spaces for totals.

The front portion 15 which carries the calendar 16 is adapted to support a pencil 19 which is held readily for use by the band 20 which may be made of plastic, metal or any other suitable material. The band 20 is anchored to the portion 15 by inserting the same through the opening formed therein. Thus the band is held with the inner portions thereof on the inside of the portion 15 and the loop for the pencil projects on the outside of the portion 15.

When it is desired to secure the visor calendar A to a car visor B, as illustrated in Figure 4, the recipient of the car visor A first removes the tape 21 which exposes the pressure sensitive adhesive surface 22. Then the recipient of the visor calendar A wraps the same around the visor B, as illustrated in Figure 4, with the flap 12 under the free edge 23 of the flap or portion 15 and the visor calendar is drawn snugly about the visor B. The pressure sensitive adhesive surface 22 is pressed against the flap 12 as illustrated in Figure 4 to firmly attach the visor calendar to the visor B.

When the visor calendar is attached to the visor B, the outer surface of the portion 15 and the portion 14 are exposed on either side of the visor B. This gives free access to the indicia on said surfaces 14 and 15 respectively and also exposes the calendar pad 16 to the recipient of the same so that he may make a complete record of the operation of his car at any time.

A feature of primary importance of my visor calendar resides in providing economical means for the recipient to keep track of the operation of his car day by day and month by month. A further primary feature is the simple manner of attaching the visor calendar to the recipient's visor which includes the easy adjustment to the sides of the visor and then securing the same firmly in place by means of the pressure sensitive edge of the portion 15.

The visor calendar A is economical to make and gives to the recipient a means of keeping a record of the operation of his car, if he wishes to do so, having the advantage of being handy and ready for use whenever it is desired.

The invention is not restricted to the illustrations within the drawings and the foregoing description but should be interpreted within the scope of the following claims.

I claim:

1. A removable visor record device having open ends including a one piece sheet-like body portion adapted to envelop the visor of an automobile in a single wrap, longitudinal scored grooves formed in said body portion to virtually divide said portion in two equal portions, one of which provides the front of said record device and the other the back thereof, the front portion having means for supporting a pencil and a calendar, the back portion having a record chart, a short free flap portion extending from said back portion, a series of longitudinally extending scored grooves formed in said body between said short flap and said back portion to permit said record device to be adjustably attached to both sides of an automobile visor, and adhesive means for fastening said short flap and said body portion together to thereby secure said record device to the visor of an automobile.

2. In a vehicle expense recording device adapted to envelop a vehicle visor intermediate the ends thereof in a single wrap and having means for recording vehicular expenses thereon, the combination consisting of a substantially rectangular body having a first and a second longitudinal edge, a short flap along the first edge adapted to overlie the second edge, said flap having spaced parallel longitudinal scored lines, a first panel section extending inwardly from the scored lines, a second panel section substantially adjacent the first panel section and extending to the second edge, a pair of closely spaced parallel longitudinal scored lines between the first and second panel sections, a calendar pad having monthly calendar sheets mounted on the second panel section, a monthly record sheet printed on the first panel section including means for totalizing a year's vehicular expenses, said device being adapted to engage the visor so that the calendar pad is exposed when the visor of a vehicle is in a normally inoperative position and adhesive means for sealing the short flap to the second longitudinal edge.

References Cited in the file of this patent
UNITED STATES PATENTS

| | | |
|---|---|---|
| Re. 3,260 | Carrington | Jan. 12, 1869 |
| 1,425,513 | Donovan | Aug. 15, 1922 |
| 1,840,425 | Andrews | Jan. 12, 1932 |
| 2,143,134 | Thacher | Jan. 10, 1939 |
| 2,181,324 | Glover | Nov. 28, 1939 |
| 2,201,197 | Minor | May 21, 1940 |
| 2,238,981 | Newell | Apr. 22, 1941 |
| 2,382,875 | Handley | Aug. 14, 1945 |
| 2,707,072 | Sims | Apr. 26, 1955 |